Dec. 22, 1953  A. M. DONOFRIO  2,663,130
APPARATUS FOR PRODUCING SYMMETRICAL
GENERALLY ELLIPSOIDAL CAPSULES
Filed Nov. 7, 1949
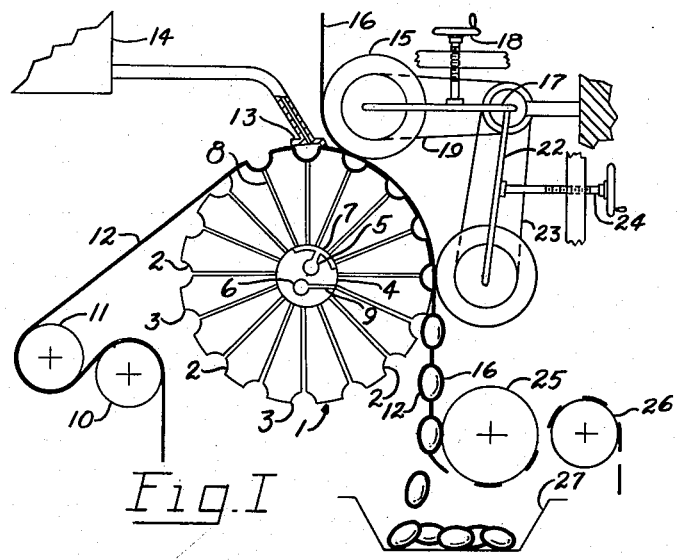
Fig. I
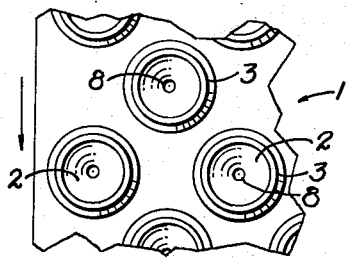
Fig. II
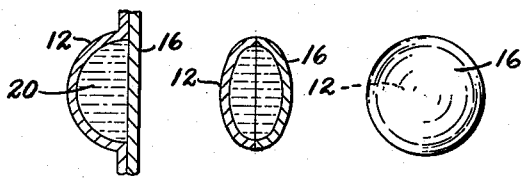
Fig. III  Fig. IV  Fig. V
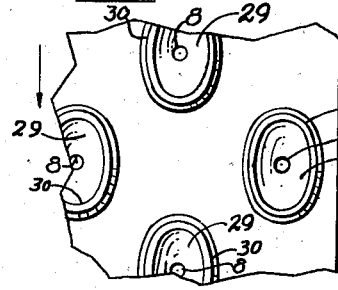
Fig. VI
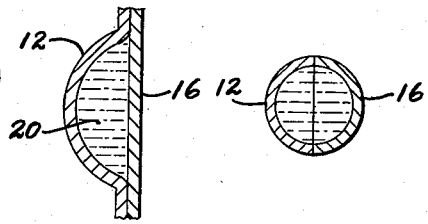
Fig. VII  Fig. VIII
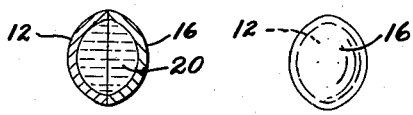
Fig. IX  Fig. X
INVENTOR.
ALFONSO M. DONOFRIO
BY
Marshall, Marshall & Leonard
ATTORNEYS Patented Dec. 22, 1953

2,663,130

UNITED STATES PATENT OFFICE 2,663,130

APPARATUS FOR PRODUCING SYMMETRICAL GENERALLY ELLIPSOIDAL CAPSULES

Alfonso M. Donofrio, Toledo, Ohio, assignor, by mesne assignments, to American Cyanamid Company, New York, N. Y., a corporation of Maine Original application December 26, 1946, Serial No. 718,527. Divided and this application November 7, 1949, Serial No. 126,026

13 Claims. (Cl. 53—89.5)

This application is a division of my co-pending application Ser. No. 718,527, now Patent No. 2,513,852 and relates to apparatus for encapsulating various kinds of substances in capsules formed from elastic sheet material; and, in particular, to apparatus for the high speed manufacture of gelatin capsules containing paste or liquid pharmaceutical or medicinal materials.

In my co-pending, now issued Patent No. 2,513,852 there is disclosed a method for the production of symmetrical, generally ellipsoidal gelatin capsules which includes the steps of forming pockets in a sheet of elastic capsulating material, filling the pockets with the material to be encapsulated, sealing the pockets with a second sheet of capsulating material which is maintained generally flat and unpocketed, sealing the two sheets of gelatinous or other elastic material together around the margins of the pockets and then cutting the sheets of material around the margins of seals to release the capsules thus formed from the web of material. By virtue of the fact that only one of the sheets of material is pocketed and thus is under much greater stress than that sheet of the material with which the pockets are covered, when the "half-capsules" are released from the web formed by the sheets, the equalization of forces between the two sheets of capsulating material results in the production of a symmetrical capsule with the two similar portions sealed together on a median plane. According to the method disclosed in the said application, the resulting shape of the symmetrical, generally ellipsoidal capsule can be precisely controlled by varying the degree of pre-stressing of the sheet of gelatin which is to be pocketed, as well as by the selection of proper shapes of the half-capsule pockets formed therein. By varying the degree of stress and by selecting appropriate shapes of the pockets, finished generally ellipsoidal capsules varying in shape, from spheres to lozenges, can be produced.

In that application, as in the instant application, the term "generally ellipsoidal" is used to cover all solid shapes produced by revolving an ellipse on one of its axes. Thus, a sphere falls within the term because a circle is an ellipse with two axes of the same length.

This application is directed toward an apparatus by means of which the process above summarized can be carried out. Prior art capsulating machines employ pairs of rollers or plates or dies each of which is provided with half-capsule die pockets and the two are brought into registry in order to form a complete capsule.

The problems involved in the matching of two half-capsule die pockets are numerous and difficult to overcome. A brief examination of the prior art reveals that this problem is one of the most difficult which has been encountered in the capsulating art.

It is, therefore, an object of this invention to provide apparatus for the production of symmetrical, generally ellipsoidal capsules in which only one die pocket member is employed.

It is another object of this invention to provide an apparatus for the production of symetrical, generally ellipsoidal capsules from two sheets of resilient capsulating material only one of which is pocketed.

It is another object of this invention to employ the high order of resiliency of capsulating materials such as gelatin in order to produce a symmetrical, generally ellipsoidal capsule from a half-capsule.

It is yet another object of this invention to provide a machine in which the two sheets of capsulating material which are sealed together around the substance to be encapsulated can be preconditioned in order to precisely control the shape and size of the finished symmetrical capsule and to locate the plane of the junction between the sheets precisely on the midpoint of the finished capsule.

The mode of achieving these and other more specific objects and advantages will be apparent from the drawings, in which:

Figure I is a schematic illustration of a capsulating machine embodying the instant invention as constructed for the production of symmertical, ellipsoidal capsules.

Figure II is a fragmentary view in elevation and on an enlarged scale of a portion of the die roll employed in the machine illustrated in Figure I and showing hemispherical die pockets for the production of symmetrical, ellipsoidal capsules.

Figures III is a vertical sectional view of a "half-capsule" produced on the die roll illustrated in Figure II after it is filled and sealed but before it is severed from the sheets of gelatin passing through the machine.

Figure IV is a vertical sectional view of one type of symmetrical generally ellipsoidal capsule produced on the apparatus shown in Figure I and shown after its "half-capsule" has been severed from the sheets of material and the physical reaction provided for has taken place.

Figure V is a view in elevation of the capsule shown in Figure IV.

Figure VI is a view similar to Figure II but of semi-ellipsoidal die pockets designed for the fabrication of half-capsules for the production of symmetrical spherical capsules.

Figure VII is a view similar to Figure III but of a half-capsule produced in a die pocket such as those shown in Figure VI.

Figure VIII is a vertical sectional view of a spherical capsule such as might result from the production of a half-capsule in the form illustrated in Figure VII.

Figure IX is a vertical sectional view of a symmetrical ellipsoidal capsule which may be produced on the machine shown in Figure I and employing die pockets such as are shown in Figure II.

Figure X is a view in elevation of the capsule shown in Figure IX.

The apparatus illustrated in Figure I schematically shows a machine embodying the invention through the use of which it is possible to produce generally ellipsoidal capsules such as those illustrated in Figures III, IV, V, IX and X and which is designed also to employ an appropriate die roll for the production of the capsules illustrated in Figures VII and VIII. A capsulating machine embodying the invention may comprise, among other parts, a rotatable die roll 1 which is mounted to rotate on a horizontal axis and has a plurality of pockets 2 cut in its periphery. It will be appreciated that although only one row of pockets is shown in Figure I, the number of die pockets 2 in the periphery of the roll 1 is limited solely by the diameter of the roll, the size of the capsules to be produced and the length of the roll. As is shown in Figure II, the die pockets 2 can be staggered and extend axially along the periphery of the die roll 1, covering substantially its entire surface.

Each of the die pockets 2 shown in Figures I and II is semi-spherical in shape and is bordered by a raised annular lip 3 which extends above the periphery of the roll 1 serving thus as a shearing edge as will later be described. The die roll 1 rotates on a shaft 4 in which is provided an exhaust manifold 5 and a pressure manifold 6. The exaust manifold 5 has a circumferentially extending port 7 which is in line with a plurality of radial passageways 8 each leading to the bottom of one die pocket 2 in a circumferentially extending row of die pockets. The pressure manifold 6 has an outlet orifice 9 which is in line with the same series of passageways 8 and opens at a point somewhat beyond the end of the port 7.

A pair of feeding rollers 10 and 11 are mounted upon spaced horizontal axes parallel to the axis of the roll 1 and located at a level below the uppermost portion of the roll 1. A sheet 12 of resilient capsulating material such as gelatin is led over the feeding rollers 10 and 11 and then upwardly and over the top of the die roll 1. The exhaust manifold port 7 is so positioned that immediately after the sheet 12 of gelatin engages the surface of the die roll 1, one of the passageways 8 reaches the port 7 and vacuum is applied to the corresponding pocket 2 to depress the gelatinous sheet 12 into the pocket. Because the sheet of gelatin is relatively taut between the feeding rollers 10—11 and the die roll 1, this depression or pocket formed in the sheet is formed by stretching the sheet outwardly on a line generally perpendicular to its plane. This creates a substantially uniform stress within that portion of the gelatin sheet which, since it is elastic, seeks to restore to its previous flat condition.

At a position one die pocket beyond the point at which the gelatin sheet is depressed into a die pocket, there is located a feeding shoe 13 which is of sufficient size to overlie one of the pockets 2 and is connected to a tank 14 equipped with a pump, not shown, for containing a bulk supply of the material to be encapsulated. The pump is so synchronized with the rotation of the die roll 1 that as each of the half-pockets pass beneath the feeding shoe 13 a measured amount of the material to be encapsulated is discharged into the half-capsule pocket. By selecting the size of the die pockets 2, the thickness of the gelatinous sheet 12, and the concentration of medicinal, pharmaceutical or other agent in the solution or paste contained within the supply tank 14, each half-capsule can be charged with a pre-determined and carefully controlled amount of the active substance.

A smooth surfaced sealing roller 15, which also is mounted upon a horizontal axis, is located just beyond the feeding shoe 13 and serves to both feed a second sheet 16 of the encapsulating material and to seal the second sheet 16 to the first sheet 12 around the margins of the half-capsules or filled pockets formed in the sheet 12. The feeding roller 15 is mounted upon a movable bracket 17 which can be adjustably positioned relative to the die roll 1 by screw means 18 or similar mechanism and is driven by a belt 19 or similar mechanism with its surface travelling in the same direction as the adjacent surface of the die roll 1. Depending upon the thickness of the two sheets of capsulating material 12 and 16, upon the temperature to which they are heated, and to a certain extent upon the degree of tackiness resulting from their particular formula, the position of the sealing roller 15 is varied to press it more or less tightly against the raised annular lips 3 on the pockets 2 to close the half-capsules.

A half-capsule comprising a flat portion of the sheet 16 and a pocketed portion of the sheet 12 and containing a quantity of substance 20 is now in the form shown in section in Figure III. Because the half-capsule is not yet severed from the main web formed by the sheets 12 and 16 and because the passageway 8 associated with the particular half-capsule pocket 2 still is connected to the exhaust port 7, the half-capsule as illustrated in Figure III is retained in its die pockets 2 and maintained in its half-capsule shape.

As the die roll 1 continues to revolve the half-capsule is maintained in that condition for a brief period of time thus to allow a slight degree of drying or setting of the annular sealed area surrounding the closed substance containing pocket. A cutting roller 21 which is somewhat similar to the sealing roller 15 and also has a smooth periphery is positioned to engage the two sheets of gelatinous material just after each pocket has been moved to a point where its vacuum passageway 8 no longer is in line with the exhaust port 7. The cutting roller 21 is mounted upon a bracket or frame 22 and driven by a belt or similar means 23. The pressure between the cutting roller 21 and the sheets of gelatin 12 and 16 is controlled by screw means 24 or other similar mechanism.

As the sheets of gelatin 12 and 16 and their sealed half-capsules pass beneath the surface of the cutting roller 21 the two sheets 12 and 16 are severed from the remaining web of gelatin formed by the two sheets 12 and 16 by pinching the sheets against the annular lips 3 which surround the pockets 2. Immediately thereafter the passageways 8 of the pockets 2 line up with the respective orifices 9 of the pressure manifold 6. The air blast ejects the closed severed capsules from the half-capsule pockets 2. As soon as the vacuum is released on the pocketed sheet and as the half-capsules are ejected from their respective pockets, the differential stress in the two sheets 12 and 16 equalizes, acting through the substance 20 contained therein which hydrostatically transmits the force stored in the pocketed or deformed sheet 12 to the previously flat sheet 16. The equalization of the forces between the two sheets results in an immediate change in shape from that shown in Figure III to the symmetrical, generally ellipsoidal shape shown in Figure IV where the two sheets 12 and 16 are bulged to the same extent. Because the half-capsule pockets 2 in the die roll are hemispherical in shape and because the depression of the sheet 12 therein creates a relatively uniform amount of stretch throughout that portion of the sheet, a resulting capsule, as illustrated in Figures IV and V, is generally circular in elevation from one side and is a thin oval in its transverse planes. The parting line between the two sheets 12 and 16, however, lies almost precisely on the median plane of the capsule because the pre-pocketed sheet 12 and the generally flat sheet 16 are selected from the same type of material, of the same thickness and containing the same chemical substances so that the elasticity of both sheets is substantially the same and the force created by the pocketing of one sheet is equalized between the sheets.

After the web formed by the sheets 12 and 16 leaves the surface of the die roll 1 and the capsules assume their symmetrical shape, they may yet cling to the web because of the remaining tackiness of the gelatinous material. The web containing the capsules is, therefore, led down and around a pair of rollers 25 and 26 which pull the web tightly against their peripheries serving to force the capsules out of the web. The capsules then fall into a pan 27 or other container where they may be left to dry or by means of which they may be carried to packaging or other machinery.

Apparatus embodying the invention also is designed for the production of the more uniformly shaped capsule illustrated in Figures IX and X. In order to achieve the final shape shown in Figures IX and X, the sheet of gelatin 12 which is to be pocketed is pre-stretched longitudinally which results in there being a greater amount of force stored in the pocketed portions to act along one axis then the amount of force stored therein to act along an axis at right angles thereto. This is accomplished by rotating the feeding rollers 10 and 11 at such speed that the linear speed of the gelatin travelling over their surfaces is slightly less than the linear speed of the gelatin travelling over the pocketed die roll 1. This imparts a controlled degree of stretch to the span of the gelatin 12 extending between the feeding roller 11 and the die roll 1. Means for controlling the particular speed of revolution of the feeding rolls 10 and 11 is not detailed in the drawings but may consist in any gearing or belting which may be variable in any of the manners well-known in the art.

When this pre-longitudinal stretching of the pocketed sheet of gelatin has taken place, it is pocketed to the same extent by being sucked into the half-capsule pockets 2. The half-capsule pockets are filled with the same amount of material to be encapsulated. The half-capsule pockets are sealed and severed in the manner already described. As soon as the half-capsules are relieved, the force stored in the pocketed and stretched sheet of gelatin 12 acts on the unpocketed and less stretched sheet of gelatin 16 to equalize the degree of bulge in the two sheets. Inasmuch as the pocketed sheet 12 has been stretched to a greater degree than is necessary for the production of the capsules shown in Figures IV and V and particularly since the sheet 12 of gelatin is stretched considerably more longitudinally than transversely, the force resolves itself in bulging the capsule to a greater degree in one direction than the other. Consequently, the finished capsules have an oval elevation as shown in Figure X and are slightly smaller in size than the capsules shown in Figures IV and V to contain the same quantity of encapsulated substance. Again, however the two sheets of gelatin 12 and 16 are bulged to the same degree and the junction line between them again lies on a median plane.

When it is desired to produce spherical capsules on the apparatus schematically shown in Figure I a change in die pocket design is necessary. A die roll 28 suitable for the production of spherical capsules on an apparatus embodying the invention is shown in elevation in Figure VI. The sole difference between the die roll 28 of Figure VI and the die roll 1 of Figures I and II lies in the shape of the half-capsule pockets. Half-capsule pockets 26 of the die roll 28 are elliptical in elevation and are semi-ellipsoids rather than hemispheres. The longer axes of the semi-ellipsoidal pockets extend circumferentially of the die roll 28 which, as in the case of the die roll in Figure II, rotates in the direction of the arrows in these figures. Each of the semi-ellipsoidal pockets 29 is surrounded by a raised lip 30 corresponding in shape and function to the lips 3 of the pockets 2.

In order to produce the spherical capsules shown in Figure VIII, the sheet 12 of gelatin again is pre-stretched longitudinally by rotating the feeding rollers 10 and 11 at a lower linear speed than the linear speed of rotation of the die roll 28. After the sheet 12 has been depressed into the semi-ellipsoidal pockets 29, filled with a quantity of substance 20, capped by the less stretched generally flat sheet 16 and sealed around the margins of the filled pockets, the half-capsules have a cross section on a plane perpendicular to the axis of the die roll 28 such as is shown in Figure VII on an enlarged scale.

As soon as the semi-ellipsoidal capsules or half-capsules shown in Figure VII are released, i. e., after they are cut from the sheets of gelatin 12 and 16 and ejected from the half-capsule pockets 29, the equalization of forces between the two sheets of gelatin 12 and 16 again takes place and the resulting capsule assumes an almost perfect spherical shape as shown in Figure VIII. This results from the fact that a much greater force is stored in the gelatin along the longer axis of the half-capsule shown in Figure VII than is stored in the axis perpendicular thereto. Consequently, the restoring action along the longer axis results in pulling the capsulating material inwardly a greater degree and, through the hydrostatic force transmission of the sheets 12 and 16, results in the capsule taking the smallest shape which will enclose the given amount of encapsulated substance, i. e., a sphere. By controlling the degree of pre-stretching of the pocketed sheet 12, the subsequent equalization of forces upon release of each sealed half-capsule can be precisely determined to result in an almost perfect sphere.

The apparatus which has been described and the operation of which has been set forth above, has been illustrated only diagrammatically inasmuch as all operating elements thereof with the exception of their particular design and the mode in which they are operated are known in the art. The invention herein consists in an apparatus for the production of symmetrical, generally ellipsoidal capsules which may have axes of identical lengths or of different lengths through the use of a single pocketed die roll and means for pocketing the gelatin in the die roll, charging the half-capsule pockets with substance to be encapsulated, sealing the charged half-capsule pockets with a second sheet of gelatin, and severing the sealed half-capsules from the sheets of material as set forth in the claims below.

Having described the invention, I claim:

1. Apparatus for forming substantially symmetrical capsules in an asymmetric die roll system from continuous strips of gelatinous elastic sheet capsulating material comprising, in combination, a die roll having die pockets in its surface and raised lips circumscribing said die pockets, means for feeding a continuous lower sheet of gelatinous elastic material over and in contact with said die roll, means for depressing said sheet into said die pockets a distance sufficient to produce pockets of definite volume in said sheet, means for filling said pockets with a completed capsule sized charge of the substance to be encapsulated, means comprising a smooth periphery roll rotating on an axis parallel to the axis of the die roll, with its periphery in contact with said lips and moving at the same surface speed and in the same direction as said lips at the line of contact for feeding a second continuous sheet of unpocketed gelatinous elastic material over the said lower sheet containing the filled pockets and sealing the two sheets of elastic material together around the edges of said pockets and substantially severing the thus formed filled capsules from the residual webs of sheet material, and means embodied in said apparatus for ensuring that the pocketed portion of the respective initially formed asymmetrical capsules is under sufficiently greater tension than the unpocketed portion that upon release of the capsules the said greater tensioned portion acts through the capsule contents to deform said unpocketed portion and produce a substantially symmetrical capsule.

2. Apparatus for forming substantially symmetrical capsules in an asymmetric die roll system from continuous strips of gelatinous elastic sheet capsulating material comprising, in combination, a die roll having die pockets in its surface and raised lips having generally cylindrical peripheral surfaces and circumscribing said die pockets, means for feeding a continuous lower sheet of elastic material over and in contact with said die roll, means for depressing said sheet into said pockets to produce pockets of uniform volume in said material and an internal stress in said sheet, means for filling said pockets with a completed capsule size charge of the substance to be encapsulated, a smooth surface roll for feeding a second less stressed continuous unpocketed sheet of elastic material over the filled pockets, said smooth surface roll engaging the said lips through the sheets of elastic material around the edges of said pockets, means for ejecting the filled sealed capsules from said die pockets and separating the capsules from the residual web of sheet material, and means embodied in said apparatus for ensuring that the pocketed portion of the respective initially formed asymmetrical capsules is under sufficiently greater tension than the unpocketed portion that upon release of the capsules the said greater tensioned portion acts through the capsule contents to deform said unpocketed portion and produce a substantially symmetrical capsule.

3. Apparatus for forming substantially symmetrical capsules in an asymmetric die roll system from continuous strips of gelatinous elastic sheet capsulating material comprising, in combination, a die roll having die pockets in its surface and raised lips circumscribing said pockets, means for feeding a sheet of elastic material over said die roll, vacuum operated means for stretching said elastic material into said die pockets to produce pockets of uniform volume in said sheet, means for filling said pockets with uniform completed capsule size charges of the substance to be encapsulated, and means comprising a smooth seal roll for feeding a second sheet of substantially unstressed unpocketed elastic material over the filled pockets and for sealing the two sheets of elastic material together around the edges of said pockets and for severing the thus formed filled capsules from the residual portions of the two sheets of elastic material, and means embodied in said apparatus for ensuring that the pocketed portion of the respective initially formed asymmetrical capsules is under sufficiently greater tension than the unpocketed portion that upon release of the capsules the said greater tensioned portion acts through the capsule contents to deform said unpocketed portion and produce a substantially symmetrical capsule.

4. Apparatus for forming substantially symmetrical capsules in an asymmetric die roll system from continuous strips of gelatinous elastic sheet capsulating material comprising, in combination, a die roll having die pockets in its surface and raised lips circumscribing said die pockets, means for feeding a sheet of elastic material over said die roll, means for stretching said elastic material into said die pockets to produce pockets of uniform volume in said sheet, means for filling said pockets with uniform measured completed capsule size charges of the substance to be encapsulated, a smooth periphery roll for feeding a second sheet of unpocketed elastic material over the filled pockets and for sealing the two sheets of elastic material together around the edges of said pockets and means for separating the filled capsules from the residual portions of the two sheets of elastic material, and means embodied in said apparatus for ensuring that the pocketed portion of the respective initially formed asymmetrical capsules is under sufficiently greater tension than the unpocketed portion that upon release of the capsules the said greater tensioned portion acts through the capsule contents to deform said unpocketed portion and produce a substantially symmetrical capsule.

5. Apparatus for forming substantially symmetrical capsules in an asymmetric die roll system from continuous strips of gelatinous elastic sheet capsulating material comprising, in combination, a die roll having die pockets in its surface and a raised lip circumscribing each of said die pockets, means for feeding a sheet of gelatinous capsulating material stretched in the longitudinal direction only over said die roll, vacuum means for depressing said sheet into said die pockets, means for depositing a measured completed capsule size charge of substance to be encapsulated into each of said pockets, means including a smooth surface roll for feeding a second unpocketed substantially smooth less stretched sheet of material over the filled pockets and for sealing the two sheets of capsulating material around the peripheries of the pockets, said smooth surface roll engaging the said lips through the sheets of capsulating material for severing the filled sealed capsules from the sheets around the peripheries of the sealed capsules and means for separating the thus formed capsules from residual portions of the sheets, and means embodied in said apparatus for ensuring that the pocketed portion of the respective initially formed asymmetrical capsules is under sufficiently greater tension than the unpocketed portion that upon release of the capsules the said greater tensioned portion acts through the capsule contents to deform said unpocketed portion and produce a substantially symmetrical capsule.

6. Apparatus for forming substantially symmetrical capsules from continuous strips of gelatinous elastic sheet capsulating material comprising, in combination, a die roll having staggered rows of die pockets in its surface and a raised lip circumscribing each of said die pockets, means for rotating such die roll, means for feeding a continuous lower sheet of capsulating material at a lower speed than the surface speed of said die roll to said die roll, thereby stretching said sheet, a vacuum lead to each of said pockets in said die roll for deforming said sheet into said pockets, substance depositing means for depositing a measured charge of substance to be encapsulated into each of said pockets, and sealing and severing means, including a smooth surface roll engaging said lips through the sheets, for feeding a second less stretched sheet on a converging path and over the filled pockets, for severing said filled and sealed capsules from the residual portions of the sheets so that unequally stretched portions of the two sheets are cut out and sealed to each other to form capsules so that as the difference in internal stress from stretching in the cut out portions is equalized, the less stretched portion is bulged and the stretched portion contracts, forming a symmetrical generally ellipsoidal capsule having two equal halves joined on a median plane.

7. Apparatus for forming substantially symmetrical capsules in an asymmetric die roll system from continuous strips of gelatinous elastic sheet capsulating material comprising, in combination, a power driven cylindrical die roll having a plurality of die pockets cut in its periphery and a raised lip circumscribing each of said die pockets, a vacuum lead to each of said pockets, means to attach each lead in turn to a source of vacuum, power driven feeding rollers rotated at a linear surface speed slower than the linear surface speed of rotation of said die roll for feeding a sheet of capsulating material over the surface of said die roll and for imparting a selected amount of longitudinal stretch thereto, a substance supply, means for transferring measured charges of substance from said supply and depositing a completed capsule size charge into each of the pockets in said sheet, a smooth surface feeding roller for feeding a second unpocketed sheet of capsulating material over the charged pockets and for sealing the two sheets together around the margins of said pockets to form generally semi-ellipsoidal capsules, said lips engaging the periphery of said roll through the sheets of capsulating material, and a second smooth roll for severing said sealed capsules from the sheets, and means embodied in said apparatus for ensuring that the pocketed portion of the respective initially formed asymmetrical capsules is under sufficiently greater tension than the unpocketed portion that upon release of the capsules the said greater tensioned portion acts through the capsule contents to deform said unpocketed portion and produce a substantially symmetrical capsule.

8. Apparatus for forming substantially symmetrical capsules from continuous strips of gelatinous elastic sheet capsulating material comprising, in combination, a power driven, cylindrical die roll having a horizontal axis and a plurality of staggered rows of die pockets cut in its periphery, a raised lip circumscribing each of said die pockets, vacuum manifold means in said roll having leads to each of said die pockets, power driven feeding rollers rotated at a linear surface speed slower than the linear surface speed of rotation of said die roll and located at a level below the upper part of said die roll for feeding a sheet of capsulating material up over the surface of said die roll and for imparting a selected amount of longitudinal stretch thereto, valve means for controlling said vacuum manifold means to pull said sheet into each of said die pockets before said pocket reaches the uppermost point of rotation of said die roll to form semi-ellipsoidal pockets therein, a substance supply, means for transferring a measured charge of substance from said supply and depositing it into each said semi-ellipsoidal pocket when said pocket is generally horizontal at the top of said die roll, a smooth surface feeding roller for feeding a second sheet over the charged pockets and for sealing the two sheets together around the margins of said pockets immediatey following the charging thereof, and means spaced from said feeding and sealing roller a distance sufficient to provide for partial drying of the sealed surfaces of said sheets for ejecting sealed capsules from the sheets, whereby the longitudinal stretch in the portion of the capsule formed from the lower sheet causes the formed capsule to assume a symmetrical shape.

9. Apparatus for forming symmetrical capsules in an asymmetric roll system from two continuous sheets of gelatinous elastic material comprising, in combination, only one rotary die roll with die pockets cut in its periphery and a raised lip circumscribing each of said die pockets; a smooth periphery sealing roll engaging the lips on said die pockets through the sheets and rotating in a direction contra to the direction of rotation of said die roll, the axes of said die roll and said sealing roll being parallel; means for feeding two sheets of elastic capsulating material to the peripheries of said die roll and said sealing roller; drive means, for said means for feeding, which causes the die roll contacting sheet to be stretched prior to its engagement with the periphery of said die roll; means for depressing said stretched sheet into said die pockets to form substance receiving pockets of uniform volume therein; means for depositing a measured completed capsule size charge of the substance to be encapsulated in each of said pockets prior to the engagement of said sheets between said die roll and said sealing roll, such engagement acting to seal said sheets together against said lips; means for severing the filled capsules from the combined strips, and means embodied in said apparatus for ensuring that the pocketed portion of the respective initially formed asymmetrical capsules is under sufficiently greater tension than the unpocketed portion that upon release of the capsules the said greater tensioned portion acts through the capsule contents to deform said unpocketed portion and produce a substantially symmetrical capsule.

10. Apparatus in accordance with claim 9 in which the die roll has internal exhaust leads to the bottom of each of the die pockets and that includes means for applying vacuum to said leads to each die pocket for forming pockets of definite volume in said sheet for the reception therein of substance to be encapsulated.

11. Apparatus for forming substantially symmetrical capsules from continuous strips of gelatinous elastic sheet capsulating material comprising, in combination, a die roll having die pockets in its surface, a complemental sealing roll, means for feeding a strip of capsulating material over each roll with the strips converging together in sealing relation between the rolls, the strip over the sealing roll being advanced thereover in substantially flat form, means effective in advance of said convergence for deforming the strip advancing over said die roll into said pockets, means likewise effective in advance of said convergence for depositing a measured charge of substance to be encapsulated into each of said formed pockets, means for severing the filled capsules from the combined strips, and means embodied in said apparatus for ensuring that the pocketed portion of the respective initially formed asymmetrical capsules is under sufficiently greater tension than the complemental portion such that upon release of the capsules the said greater tensioned portion acts through the capsule contents to deform said complemental portion and produce a substantially symmetrical capsule.

12. Apparatus for forming substantially symmetrical capsules from continuous strips of gelatinous elastic sheet capsulating material comprising, in combination, a die roll having die pockets in its surface and raised lips circumscribing the respective die pockets, means including a feed roll for feeding a first strip of capsulating material to said die roll for advance over the periphery thereof at a predetermined lower surface speed than the surface speed of said die roll thereby to pre-tension longitudinally said strip as delivered to said die roll, means for deforming said strip into said pockets, means for depositing a measured charge of substance to be encapsulated into each of said formed pockets, a complemental sealing roll arranged peripherally adjacent said die roll, means for feeding a second strip of capsulating material over said sealing roll in a less pre-tensioned condition than the said first strip as fed to said die roll, said strips converging and being sealed together between said die roll and sealing roll to form unsymmetrical sealed capsules adapted upon release to assume a symmetrical shape resulting from the unequal stress in the opposed portions thereof.

13. In encapsulating apparatus, in combination, a die roll having pockets in its surface, a sealing roll having a smooth surface, a continuous content-receiving strip of gelatinous elastic sheet capsulating material passing over said pocketed roll, a continuous covering strip of similar material passing over said smooth roll, said rolls being inverted on parallel axes to converge said strips in sealing relation at the bite of said rolls, means for stretching said content-receiving strip to conform with said pockets, means to deposit a measured charge of substance to be encapsulated into each of said conformed pockets of said content-receiving strip, and means to ensure that the tension of said stretched strip pockets and the tension of said covering strip are differentially correlated to effect an automatic post-sealed equilibrium by contraction of the pocket walls and extension of the cover walls when said walls become substantially symmetrical.

ALFONSO M. DONOFRIO.

References Cited in the file of this patent

UNITED STATES PATENTS

| Number | Name | Date |
| --- | --- | --- |
| 2,001,792 | Lombi | May 21, 1935 |
| 2,152,101 | Scherer | Mar. 28, 1939 |
| 2,199,210 | Scherer | Apr. 30, 1940 |
| 2,219,578 | Pittenger | Oct. 29, 1940 |
| 2,227,728 | Lombi | Jan. 7, 1941 |
| 2,323,581 | Weckesser | July 6, 1943 |
| 2,387,747 | Cowley | Oct. 30, 1945 |
| 2,490,781 | Cloud | Dec. 13, 1949 |